United States Patent Office 3,836,448
Patented Sept. 17, 1974

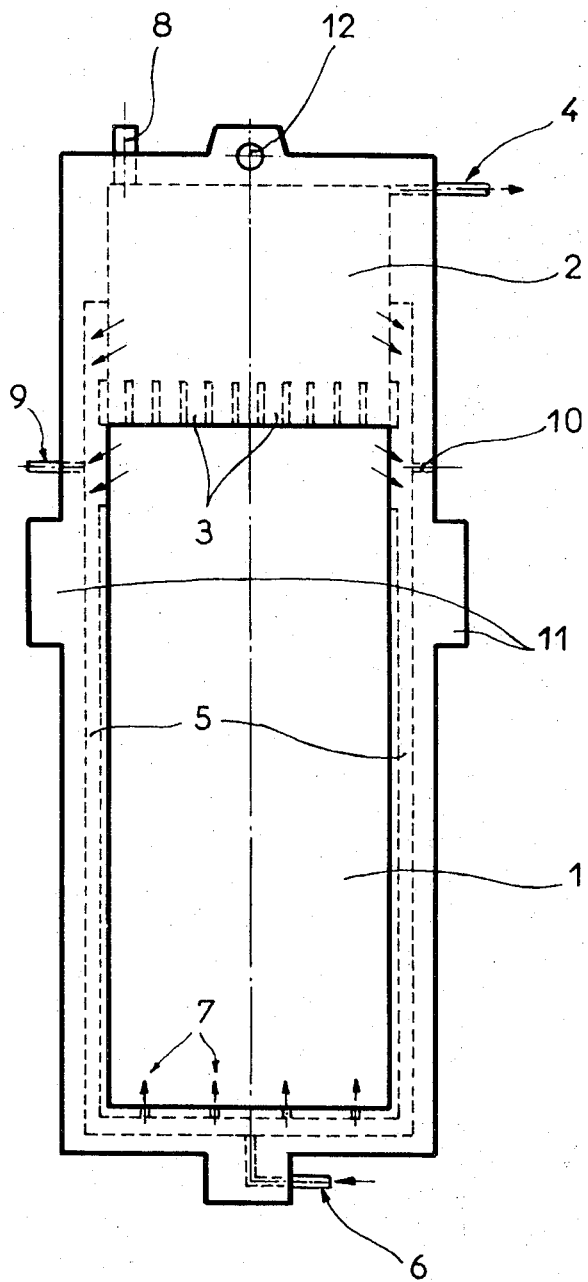

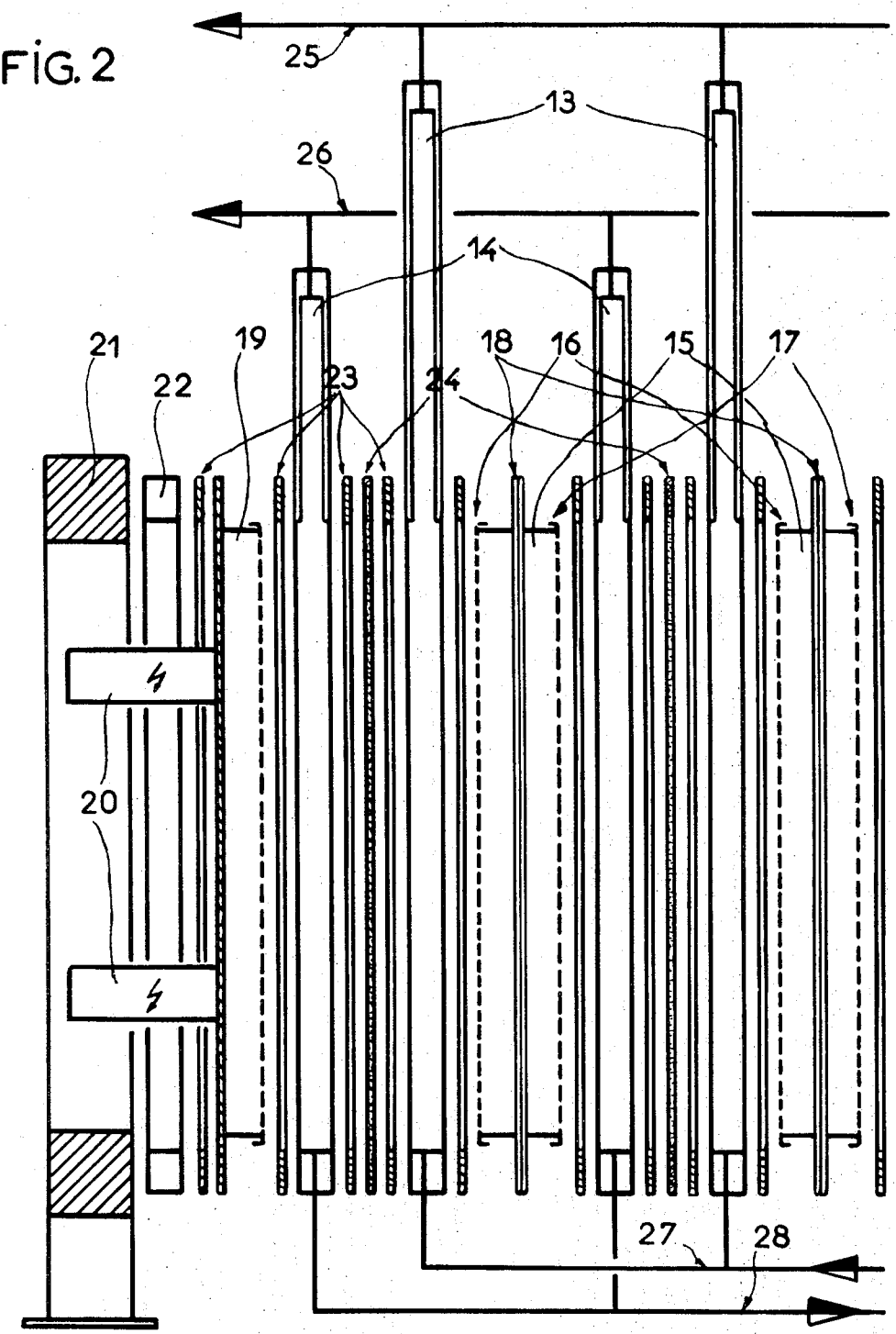

3,836,448
FRAMES FOR ELECTROLYTIC CELLS OF THE FILTER-PRESS TYPE
Pierre Bouy, Enghien-les-Bains, and Daniel Collard, Paris, France, assignors to Rhone-Progil, Paris, France
Filed Dec. 13, 1972, Ser. No. 314,817
Claims priority, application France, Dec. 23, 1971, 7146295
Int. Cl. B01k 3/00
U.S. Cl. 204—270
7 Claims

ABSTRACT OF THE DISCLOSURE

Frames for electrolytic cells of the filter-press type are provided which comprises a lower zone provided for receiving an anode or a cathode, and an upper zone in the form of a closed box, for ensuring separation of the gases produced by electrolysis from the electrolyte, the upper zone extending said lower zone, the lower zone communicating with the upper zone by way of one or more apertures in the lower part of said box, the sealing means ensuring sealing of the cells being applied over the periphery of the lower zone.

BACKGROUND OF THE INVENTION

The invention relates to frames for electrolytic cells of the filter-press type, which, by means of their structural features, permit the charge per unit of surface area of the electrodes of such cells to be increased to the maximum possible level.

The advantages of electrolytic cells of the filter-press type, and especially those in which the elementary cells are connected electrically in series, have long been known. Because of their very compact construction, such cells make much more efficient use of the surface area of manufacturing plants and require much less pipework for the inlet and the outlet of the fluids and much less capital investment on copper or aluminum for feeding them with electrical power.

However, combining a large number of elementary cells into a single mechanical assembly multiplies the dangers of stoppage of the entire assembly as a consequence of a defect which involves only one of the elementary cells. Since if the general characteristics of electrolytic cells of the filter-press type have long been defined, including the materials employed, whether for the manufacture of the electrodes, the seals, the frames or the diaphragms, a sufficient level of practicability has not been achieved. Consequently, this type of cell is not currently in widespread commercial use, at least as regards the electrolysis of alkaline chloride solutions for the production of chlorine or chlorates.

Recently, many new materials have become available, the judicious use of which not only considerably increases the practicability of such complex assemblies of cells, but also makes it possible substantially to increase the charge per unit of surface area of the electrodes. This last advantage in particular has been achieved because the electrodes used can be metal structures whose construction includes a film-forming metal, such as titanium, zirconium, tantalum, tungsten and niobium, or metals or alloys of similar anodic properties, the anodically active parts of such structures being covered with conductive layers which are chemically inert to and unattackable in the electrolyte in question. Such structures can in fact be provided in order that the electrolysis gases are given off mainly outside of the space between the cathodically and anodically active parts of the electrodes. This factor, combined in the case of cells of the filter-press type with the absence of any substantial ohmic loss in the electrodes due to transmission of the current perpendicularly to the electrolytically active surfaces of the electrodes, makes it possible on the one hand to increase the height of the electrodes and on the other hand to increase the current strength per unit of surface area without excessive rise in temperature occurring. Such bipolar electrodes are in particular described by the applicants in concurrently filed Bouy et al. applications entitled "Bipolar Electrodes," Ser. No. 314,728, filed Dec. 13, 1972, and "Dismantleable Bipolar Electrodes," Ser. No. 314,783, filed Dec. 13, 1972, such applications corresponding, respectively, to French applications filed Dec. 21, 1971 and Dec. 22, 1972 under the Ser. Nos. 7145861 and 7146072.

However, the construction of filter-press cells of high productivity, which use such bipolar electrodes, then gave rise to other problems. Experience shows in fact that frames of current design are not suitable for use in the construction of highly charged electrolytic cells, owing to the difficulties which occur in separating the gases produced and the liquids and in circulating the electrolyte. In highly charged cells, it is difficult to effect the discharge of large amounts of gases mixed with relatively large amounts of electrolyte, without making the various channels of large section. This causes excessively large current leaks which are then the consequences of gaseous and liquid flows issuing from each elementary cell combining in the collecting passages. Moreover, in such cells, the circulation of the electrolyte must be especially designed in order on the one hand to prevent excessive ion impoverishment of the electrolyte in proportion as it tends to rise in the spaces between the anodes and the cathodes, and on the other hand to prevent an excessive rise in the amount of gas bubbles in the electrolyte.

These various disadvantages are avoided by the frames according to the present invention, which provide for the separation of the gases from the electrolyte in such a way that the channels connected to the upper parts of said frames serve for discharge of gases containing only a small amount of electrolyte droplets in suspension.

It is an object of the present invention to provide filter-press electrolysis cells which are free from the objections of the prior art.

It is another object of the present invention to provide frames for filter press which facilitate separation of gaseous reaction products from the electrolyte.

Other objects of the present invention will be apparent to those skilled in the art from the present description, taken in conjunction with the appended drawings, in which:

FIG. 1 is a diagrammatical representation of an anodic frame of the present invention;

FIG. 2 shows a part of an electrolysis cell in which the frames of the invention, such as those of FIG. 1 are mounted.

GENERAL DESCRIPTION OF THE INVENTION

The above-mentioned separation of gases from electrolyte is achieved by the provision in each frame of two separate zones: (1) a lower zone in which is fitted an anode or a cathode and on to the perimeter of which is fitted the sealing gasket, and (2) an upper zone in the form of a box which communicates with the lower zone by way of one or more apertures and in which separation of the gases produced by electrolysis from the electrolyte is effected. The heights of the upper zones of the frames depend on the ease of separation of the gases and, when the cells are provided with diaphragms, the electrolyte pressure to be maintained in order to ensure that the electrolyte is circulated in the required direction. Consequently, according to the circumstances, the cathodic and anodic frames can have upper zones of equal or different heights.

This arrangement of the invention prevents the gas channels being blocked by the electrolyte and also makes it possible to prevent current leaks which can be substantial in the case of filter-press cells in which the electrical supply is in series, since the channels for the liquids, by way of which the current leaks occur, are of small cross-section and can be of the desired length in order to increase their ohmic resistance. Moreover, the sealing of the cells is ensured since the sealing gaskets are only necessary in the lower zones of the frames owing to the box shape of the upper zones. Finally, the fact that the electrolyte entrained by the gases, but separated therefrom, is present in the lower part of the upper zone of the frames, makes it possible for the electrolyte easily to be conducted, for the purposes of partial re-cycling, into the cathodic or anodic space of each elementary cell. This is done by means of a chemical which can advantageously be provided in the body of the frame in question. Obviously such frames can comprise, integrated into them, the channels for collecting the gas stream and the general channels for the supply or discharge of the electrolyte, and various apertures or devices for taking pressure, temperature or potential and appendages or holes for fixing or handling the frame.

The frames according to the present invention can be used in the construction of any types of filter-press cells, the nature of the material for forming the frames obviously being selected in accordance with temperature, the electrolyte to be treated, and the gases given off. The material used can be insulating and can be, for example, plastic materials or it can be metallic in nature. The choice of material for the frames if guided by considerations of resistance to chemical attack and also to the attack due, if the frames are made of metal, to the difference in potential between the frames and the electrolyte, such difference being caused by current leaks through the electrolyte collectors.

The frames according to the present invention are more particularly suited for the construction of filter-press cells in series connection, intended for the electrolysis of aqueous alkaline chloride solutions.

Detailed Description of the Invention

The description given hereinbelow relates to an embodiment which is given by way of a non-limitative example and which concerns the frames of the invention which are intended to be used in a chlorine-producing diaphragm cell.

Said example is described in reference to FIGS. 1 and 2 of the accompanying drawings.

The frame shown in FIG. 1 is made of molded polyester; the lower zone 1 of the frame, which is intended to accommodate the anodic part of a bipolar electrode (not shown here), communicates with the upper box-shaped zone 2 of the frame by means of a series of apertures 3. The chlorine produced escapes by way of the pipe 4 issuing at an upper point in the upper box-shaped zone 2. The electrolyte which is separated from the chlorine in the upper zone 2 is reunited, by way of channels 5 which are provided in the very body of the frame, with the electrolyte inlet 6 which is located at the middle at the bottom of the lower zone 1, and passes into the anodic part of the bipolar electrode by way of the apertures 7. Reference 8 denotes an electrical potential connection, reference 9 denotes a pressure connection, reference 10 denotes a temperature regulating connection, reference 11 denotes frame supports and reference 12 denotes a handling hole. The cathodic frames (not shown) are similar to the anodic frames, except as regards their height, and are used conjointly in a diaphragm cell of which one end is diagrammatically shown in cross-section in FIG. 2. The bipolar electrodes used in this cell are described in the applicants' above-mentioned concurrently filed patent application entitled "Bipolar Electrodes," corresponding to French application, Ser. No. 7145861.

In FIG. 2, reference 13 denotes the anodic frames and reference 14 denotes the cathodic frames. The former are higher than the latter in order to be able to have available the height of electrolyte necessary to compensate for the charge loss caused by its passage through the diaphragms. The bipolar electrodes are denoted by reference 15, while reference 16 denotes the anodic parts formed by expanded sheets of titanium, or other film-forming metal, covered with platinum, and reference numeral 17 denotes the cathodic parts in the form of mild steel grids. The two anodic and cathodic parts of each electrode are connected by welding to a mixed metal sheet 18 produced by explosion and formed of titanium and mild steel, for the electrical connection and separation of the catholyte from the anolyte. Reference 19 denotes a simple end electrode which here comprises a mild steel grid connected to a thick ribbed plate of mild steel; the electrical outputs are denoted by reference 20. Reference 20 denotes one of the end supports of the cell and reference 22 denotes a special packing frame. The sealing means are denoted by reference 23, while reference 24 denotes the diaphragms which comprise asbestos fabric. All the chlorine outlets of the anodic frames are connected to the channel 25 while the hydrogen outlets are connected to the channel 26. The electrolyte feed is effected by means of the channel 27, all the outlets being connected to a channel 28. Upon assembly, the various components of the cell are tightened together so that the cathodic and the anodic parts of the electrodes engage into the lower parts of the respective frames, the cathodic parts coming into contact with the diaphragms.

A filter-press cell as described above, constructed with electrodes having a surface area of 60 square decimeters, operating at a temperature of 90° C., with a current density of 30 a./dm.$^2$ (amperes per square decimeter) and fed with a 310 g./l. of sodium chloride solution, requires a feed voltage of only 3.2 volts per elementary cell.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Frames intended to be mounted in electrolytic cells of the filter-press type, characterized in that the frames comprise a lower zone provided for receiving an anode or a cathode, and a single upper zone in the form of a closed box for ensuring separation of the gases produced by electrolysis of the electrolyte, the upper zone extending said lower zone, the lower zone communicating with the upper zone by way of one or more apertures in the lower part of said box, sealing means ensuring sealing of the cells being applied over the periphery of the lower zone, separate frames being employed for anodes and for cathodes, said frames being free of electrically insulating partitions, said closed box occupies substantially the width of said frames, channeling means in the body of said frames for recycling electrolyte from said upper zone to the lower portion of said lower zone.

2. Frames according to Claim 1, characterized in that the electrolyte which is separated from the gases in the upper zone is recycled to the electrolyte outlet or inlet point by means of said channeling means.

3. Frames according to Claim 1, including channel means for conducting gases separated in the upper zone to a collecting channel connecting all the similar frames of the same cell.

4. Frames according to Claim 3, characterized in that the channels for collecting the gas flows and the general channels for the supply and/or discharge of electrolyte, are integrated within the frame members.

5. Filter press electrolytic cells for the electrolysis of alkali chloride solutions, comprising frames according to Claim 4, anodes and cathodes, said anodes alternating with said cathodes and said frames each separately housing each anode and cathode.

6. Filter press electrolytic cells for the electrolysis of alkali chloride solutions, comprising frames according to Claim 1, anodes and cathodes, said anodes alternating with said cathodes and said frames each separately housing each anode and cathode.

7. Frames according to Claim 6, characterized in that the boxes forming the upper zones of the anodic and cathodic frames are of different heights.

References Cited

UNITED STATES PATENTS

| | | | |
|---|---|---|---|
| 1,365,875 | 1/1921 | Ward | 204—256 |
| 2,862,864 | 12/1958 | Berghaus | 204—256 |
| 3,287,251 | 11/1966 | Horne et al. | 204—270 |
| 2,881,123 | 4/1959 | Zdansky | 204—256 |

FOREIGN PATENTS

| | | | |
|---|---|---|---|
| 501,304 | 7/1930 | Germany | 204—256 |

JOHN H. MACK, Primary Examiner

W. I. SOLOMON, Assistant Examiner

U.S. Cl. X.R.

204—256, 258, 279, 286

UNITED STATES PATENT OFFICE
CERTIFICATE OF CORRECTION

Patent No. 3,836,448     Dated September 17, 1974

Inventor(s) Pierre Bouy and Daniel Collard

It is certified that error appears in the above-identified patent and that said Letters Patent are hereby corrected as shown below:

Column 1, line 15, the word "comprises" should be "comprise".

Column 3, line 20, the word "chemical" should be "channel".

Column 3, line 65, the word "at" second occurrence, should be -- of --.

Column 4, line 40, "30a/dm.$^2$" should be "30 A/dm.$^2$".

Column 4, line 23, the second occurrence of "Reference 20" should be "Reference 21".

Signed and sealed this 19th day of November 1974.

(SEAL)
Attest:

McCOY M. GIBSON JR.
Attesting Officer

C. MARSHALL DANN
Commissioner of Patents